United States Patent [19]

Riazuelo

[11] 4,142,408
[45] Mar. 6, 1979

[54] APPARATUS FOR MEASURING AXIAL THRUST OF A ROTATING MACHINE SHAFT

[75] Inventor: Serge Riazuelo, Montberon, France

[73] Assignee: ABG-SEMCA S.A., Toulouse, France

[21] Appl. No.: 781,960

[22] Filed: Mar. 28, 1977

[30] Foreign Application Priority Data

Mar. 29, 1976 [FR] France .................... 76 09252

[51] Int. Cl.² .................................... G01L 5/12
[52] U.S. Cl. ............................................ 73/140
[58] Field of Search ............... 73/140, 117.4, 133 R

[56] References Cited

U.S. PATENT DOCUMENTS 3,722,264  3/1973  Talmo et al. ............... 73/141 A X
3,900,812  8/1975  Brewer ........................ 73/141 A X

FOREIGN PATENT DOCUMENTS 2305156  9/1973  Fed. Rep. of Germany ............ 73/140
372463   5/1973  U.S.S.R. ................................. 73/140

*Primary Examiner*—Charles A. Ruehl
*Attorney, Agent, or Firm*—Shlesinger, Arkwright, Garvey & Dinsmore

[57] ABSTRACT

An apparatus is disclosed for measuring axial thrust of a rotating, bearing supported machine shaft. The support bearings are operatively coupled through a shiftable crosspiece to a spring leaf upon which is mounted a variable resistance type strain gauge connected to an extensometric bridge circuit which provides an output indication of the axial thrust.

8 Claims, 3 Drawing Figures

APPARATUS FOR MEASURING AXIAL THRUST OF A ROTATING MACHINE SHAFT

The invention relates to a device for measuring the axial thrust being exerted on a rotating machine shaft and transmitted thereby to the bearings which support it; it is particularly applicable to the measure of the axial thrust of a turbocompressor shaft, wherein the precise ascertainment of the value of this thrust permits axial balancing of the rotating assembly in order to reduce the thrust and to increase the life of the bearings.

During study of a prototype turbocompressor, the measure of the axial thrust being exerted on the lathe shaft is realized on a suitable testing bench on which the turbocompressor is brought to the various most significant function points by adjustment of its inlet parameters. Until now, measures of thrust have been effected by successive tests while quiding the axial thrust to be applied onto a spring system which develops a force in the opposite direction from the thrust. Each measure is realized by successive trial and error, by installation of springs of different elasticity, which exert drawback forces of increasing values, for instance 5, 10, 15, 20, 25 kilorams, etc. . . . When the axial thrust is greater than the force being exerted by the spring being used, the lathe assembly is displaced by the action of the axial thrust and establishes an electrical contact which permits detection of the excess displacement. The value of the axial thrust can therefore be limited between the values of the drawback forces which are exerted by two springs mounted in succession.

Such a measuring process requires a long set up time, since it is necessary for each direction of the axial thrust to occur several times per mounting and dismounting of the spring system in order to put the springs of different elasticity in place. Also, the measure is inexact and does not allow determination of the thrust value except with the discrepancy equal to the interval between the value of the drawback forces of two successive springs.

The present invention proposes a remedy to the aforementioned inconveniences of the traditional process. It provides a device for precise measurement with neither trial and error nor successive mounting and dismounting.

The device permits measure of the axial thrust of a rotating machine supported by bearings of which the outside rings are borne by a support, and wherein it includes, joined with at least one of the bearings, at least one spring which has a collar attached to the support and one leaf of predetermined elasticity, connected to the outside ring of the bearing to submit on one contact cheek to the axial thrust transmitted to said outside ring; the elastic leaf of at least one spring is provided on one face with a strain gauge of variable electrical resistance as a function of the flexion of the leaf. This gauge is integrated with an extensometric bridge which is associated with feed means and is set to furnish a measure of the axial thrust.

The rotating machine is mounted on a testing bench; one single test simulating a function point immediately shows the value of the axial thrust. When the thrust is exerted on the shaft, it is transmitted to the springs and their flexion modifies the electrical resistance of the gauges; the extensometric bridge which is set beforehand instantly gives a measure of the actual value of this thrust. Thus it is possible to axially balance the machine shaft in a precise manner in order to reduce this thrust to an admissably low value.

According to a preferred embodiment, the elastic leaf of each spring is connected to the outside ring of the bearing by a crossbar which is axially movable, mounted in contact by one end against said outside ring and by the other end against said elastic leaf. This crossbar transmits the axial thrust directly to the various springs. Accessory elastic means, particularly a helical spring, can be provided to act axially on this movable crossbar and apply it against the outside ring of the bearing with a constant force.

A stationary abutment is also, preferably, fixed to the support of the machine shaft in order to limit the deformation of the elastic leaf of each spring to within its elastic limit.

The measuring device can have one single spring joined with each bearing; or, to balance the forces, several springs can be advantageously distributed in a transverse plane around the shaft, the contact cheeks of the spring leaves being ground true, once these springs are in place: the axial thrust is thus distributed symmetrically around the shaft, with an identical portion of it being exerted on each spring.

All of the springs can be equipped with strain gauges to confer a high sensitivity to the device; however, practice shows that the sensitivity is satisfactory by providing only a certain number of springs, for example two springs which are situated opposite each other. The gauges are integrated in series on one arm of the extensometric bridge which thus measures the variation of the sum of their electrical resistance.

According to one embodiment which permits measure of the axial thrusts being exerted in both directions by a shaft on two bearings which support it, the device includes two series of springs as above; each series, which includes at least one spring, is joined with one of the bearings; the elastic leaves of the springs of one series are connected to the outside ring of the corresponding bearing to be subjected to the axial thrust transmitted in the other direction. In this embodiment, the strain gauges of the springs of one series are integrated in series in one arm of the extensometric bridge and the strain gauges of the springs of the other series are integrated in series in another arm of the bridge. Whatever be the direction of the axial thrust, the device immediately furnishes a measure; the direction of the passage of the imbalance current which circulates in the measure arm of the bridge gives the direction of the axial thrust.

The following description, in reference to the attached drawings, is given as a nonlimiting example of one embodiment of the invention.

Figure 1:
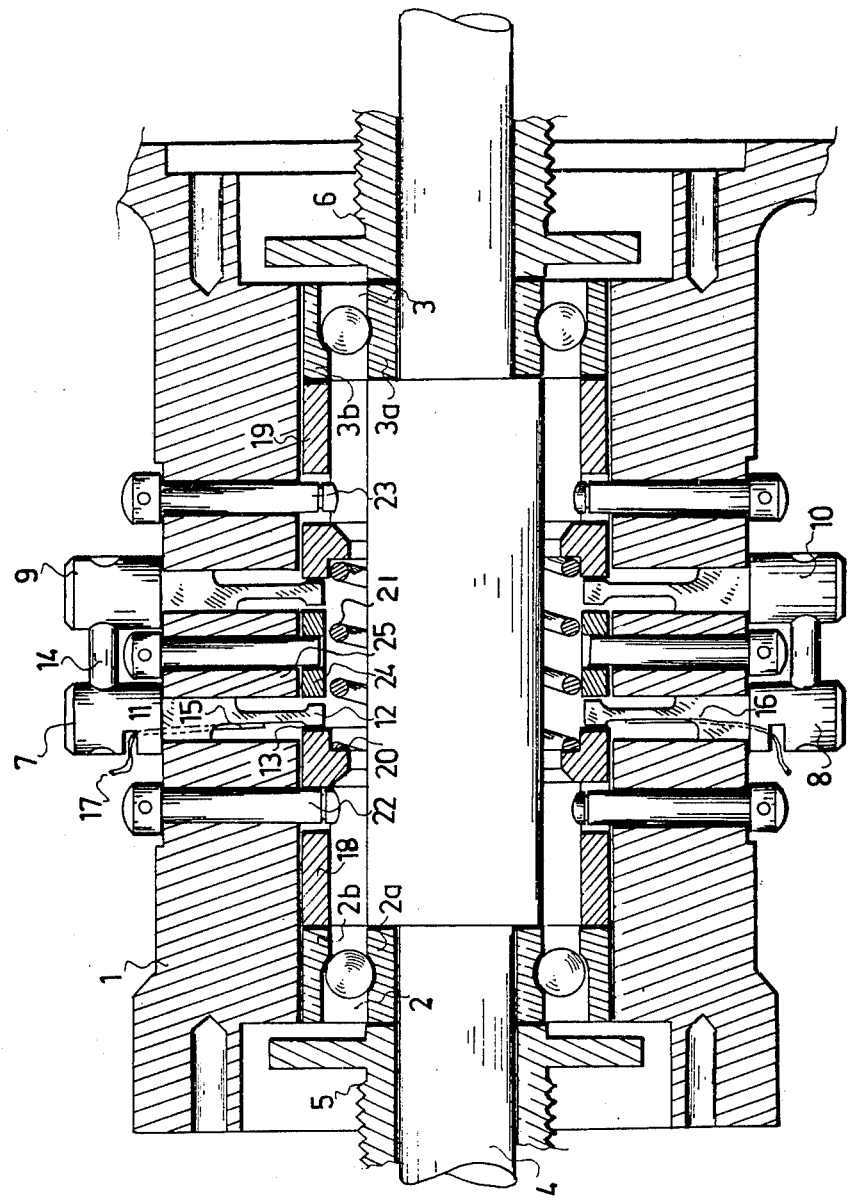
FIG. 1 shows an axial cross section of a measuring device according to the invention mounted on a turbocompressor between the turbine and the compressor (not shown).

The turbocompressor shown partially as example in FIG. 1 includes a sheathing 1 of the traditional type having a bearing 2 on the compressor side and a bearing 3 on the turbine side; by their inside rings 2a and 3a, the bearings support a rotating shaft 4 which in turn supports on one side the compressor wheel or wheels (left side) and on the other side the turbine wheel or wheels (right side). As is customary, the inside bearing rings are in contact, on one side, with the shoulders of shaft 4, and on the other side with the lateral abutments 5 and 6 on this shaft.

In the invention, two series of springs are associated with bearings, for example springs 7 and 8 being associated with bearing 2 and springs 9 and 10 being associated with bearing 3. In the example, each series includes four springs which are angularly mounted 90° from each other.

Each spring is a straight spring provided with a collar 11 which serves to attach it in the sheathing and with an elastic leaf 12 with a contact cheek 13 near one end. Each spring is mounted in a cylindrical radial lodging which is in the sheathing; it is attached by fitting a portion of its collar by force into this lodging, which is of suitable diameter. A pin 14 connects the outer portions of the collars of the spring pairs which are face to face, in order to avoid that these springs turn by themselves.

In the described embodiment, opposite springs 7 and 8 of the series which is joined with bearing 2 are each provided with strain gauges 15 and 16 respectively, as are the two other springs of the other series, and an analogous mounting is provided with a staggering of 90°: springs 9 and 10 which are in the plane of FIG. 1 have their gauges removed, while the two other springs which are situated perpendicular to this plane are each provided with a strain gauge.

Each strain gauge adheres to the elastic leaf of the corresponding spring so that its electrical resistance is a function of the state of flexion of this leaf. Small grooves are found on the collar of the spring to protect the passage of the conductor wires such as 17 which are connected to the gauges.

Also, the elastic leaves of the four springs of each series are in contact by their cheeks 13 against sleeve-like crosspieces 18 and 19, movable in the axial direction. To provide identical contact conditions for the four springs of the series, cheeks 13 are ground true once the springs are in place.

Crosspieces 18 and 19 each have a flange such as 20 which serves for engagement with a helical spring 21 which is engaging the crosspieces with constant force against outside rings 2b and 3b of the bearings. To facilitate the assembly, shafts 22 and 23 hold these crosspieces while the bearings are being placed; these shafts are engaged in the openings provided on the crosspieces with sufficient play to retain their axial mobility while the assembly is being assembled.

A central annular abutment 24 is maintained axially by a shaft 25 between the springs of the two series; this abutment limits the deformation of the springs to within their elastic limit in order to avoid deterioration in case of two intense an accidental thrust.

Figure 2:
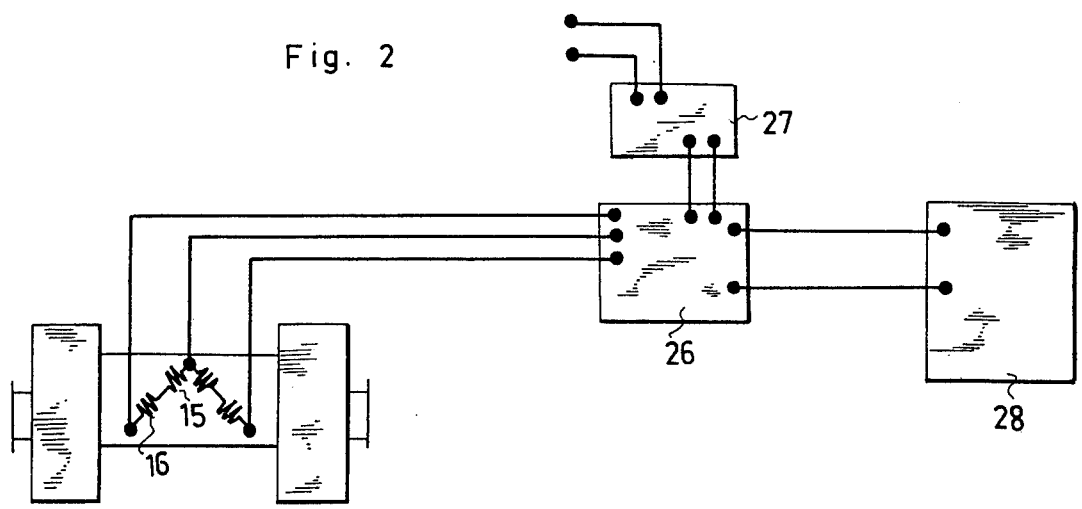
FIG. 2 is a diagram of the electrical installation of the measuring device.

FIG. 2 is a diagram of the electric installation of the gauges in an extensometric bridge 26 which is connected with balanced feed means 27.

The two gauges 15 and 16 which are joined with one series of springs are mounted in series in one arm of the bridge and the two gauges which are joined with the other series are mounted in series in another arm of the bridge. In the traditional manner, the two other arms of the bridge require fixed value resistances.

A register 28 can be associated with bridge 26 in order to register the measurements and to trace the curves which are set beforehand for comparison.

Figure 3:
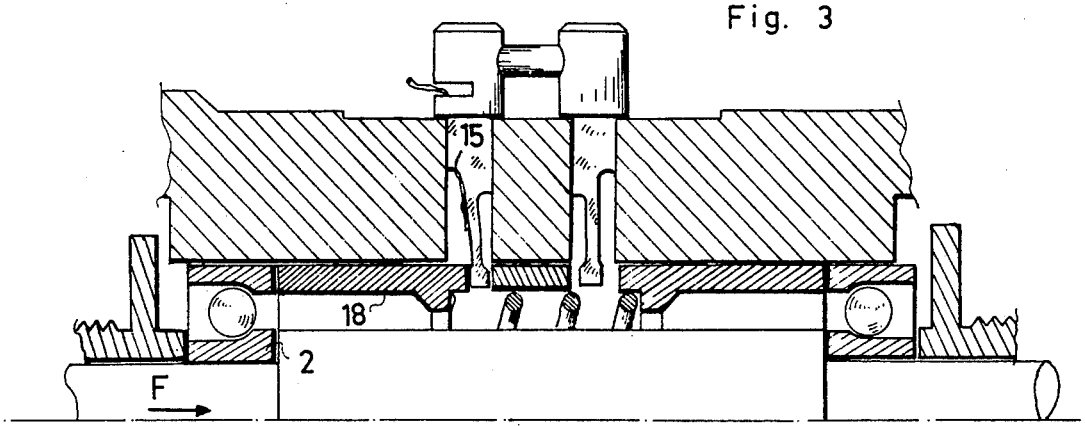
FIG. 3 is a diagram of the device in course of function, with the axial displacement of the shaft being exaggerated to render this drawing more explicit.

FIG. 3 is a diagram of the function of the measuring device when an axial thrust F is exerted by the rotating shaft assembly. This thrust is transmitted by bearing 2 to crosspiece 18 which engenders the flexion of the springs by being axially displaced (the displacements are of course very slight, for example on the order of about a hundred microns for axial thrusts on the order of 30 kilograms). The value of the electrical resistances of gauges 15 and 16 is modified by the flexion of the springs and the bridge is unbalanced, but the resistances in the other arms have not varied. A previous setting is effected by applying known value thrusts to the lathe assembly while it is stopped.

What is claimed is:

1. A device for measuring the axial thrust of a rotating shaft supported by bearings having inner and outer races wherein the outer races are mounted on a support, said measuring device comprising:

at least one radially disposed leaf spring member mounted in said support and having a spring leaf of predetermined elasticity connected to the outer race of one of said bearings in such a manner as to be subjected to axial thrust transmitted to said outer race, said spring leaf including thereon a strain gauge of variable electrical resistance as a function of the flexure of said spring leaf, said strain gauge being integrated with an extensometric bridge circuit having electrical feed means and calibrated so as to furnish a measure of axial thrust as a function of the flexure of said spring leaf, said spring leaf of each leaf spring member being connected to said outer race of one of said bearings by an axially movable crosspiece, and mounted in contact by one end against said outer race and by the other end against said elastic spring leaf.

2. Measuring device as in claim 1 and including a helical spring, acting axially on said movable crosspiece for urging said crosspiece against said outer race of said bearing with a constant force.

3. Measuring device as in claim 1 and including abutment means fixed to said support for limiting the deformation of each spring leaf to a value below its elastic limit.

4. Measuring device as in claim 1 wherein said leaf spring member includes a collar mounted in a radially passageway in said support, said collar being fitted by force into said passageway.

5. Measuring device as in claim 4 and including a plurality of said leaf spring members joined with each bearing and distributed in a transverse plane around said shaft, said spring leaves being ground true after said leaf spring members are in place for balancing the forces around said shaft.

6. Measuring device as in claim 5, wherein said strain gauges are mounted on a plurality of said spring leaves, said gauges being integrated in series into an arm of the extensometric bridge for measuring the variation of the sum of their electric resistance.

7. Measuring device as in claim 1 for measure of the axial thrusts exerted in two directions by said rotating shaft supported by at least two bearings, said device including two series of said leaf spring members, each series having at least one spring leaf and being associated with one of said bearings, said spring leaves of one series being connected to the outer race of one bearing in order to be subjected to the axial thrust transmitted in one direction and said spring leaves of the other series being connected to the outer race of the other bearing in order to be subjected to the axial thrust transmitted in the opposite direction, and the strain gauges of the spring leaves of one series are integrated in series into one arm of said extensometric bridge and the strain gauges of the spring leaves of the other series are integrated in series in another arm of said bridge.

8. Measuring device as in claim 7 for measuring the axial thrust of said shaft, said shaft having a pair of spaced shoulders thereon and carrying a pair of collars having lateral abutments, wherein said inner races of said bearings engage on one side against the shoulders of the shaft and on the other side against the lateral abutments carried by said shaft, said leaf spring members being situated between said bearings, the spring leaves of one series being connected to the outer race of one bearing by a first movable crosspiece and the spring leaves of the other series being connected to the outer race of the other bearing by a second movable crosspiece, and a helical spring mounted between said crosspieces engaging said crosspieces for urging said crosspieces against the outer races of the corresponding bearing.

* * * * *